March 22, 1932.  J. GUTMANN, JR  1,850,203
JACKING APPARATUS
Filed June 27, 1929   2 Sheets-Sheet 1
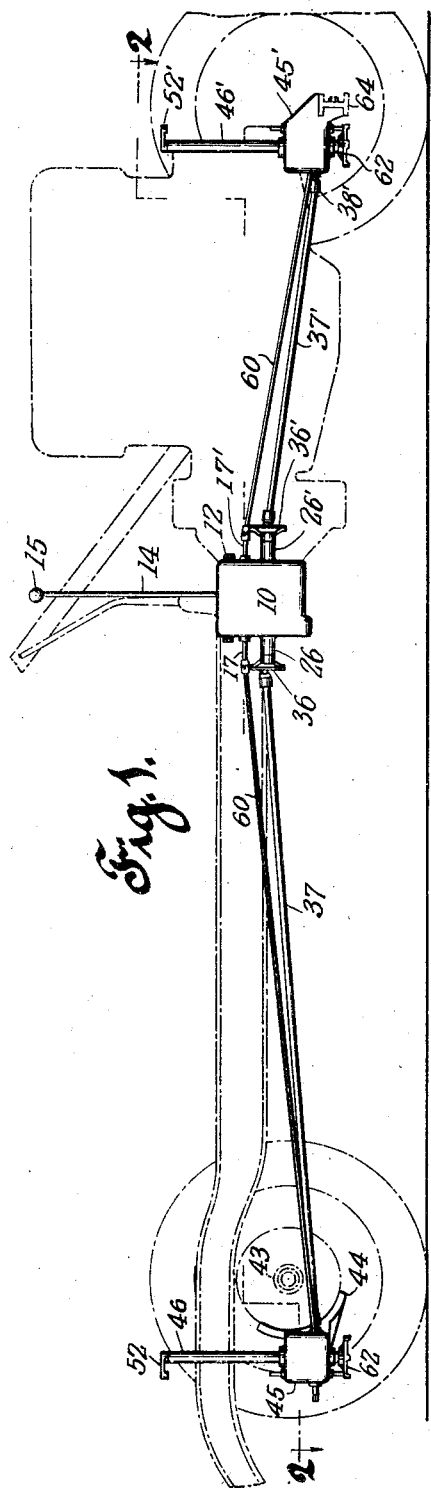
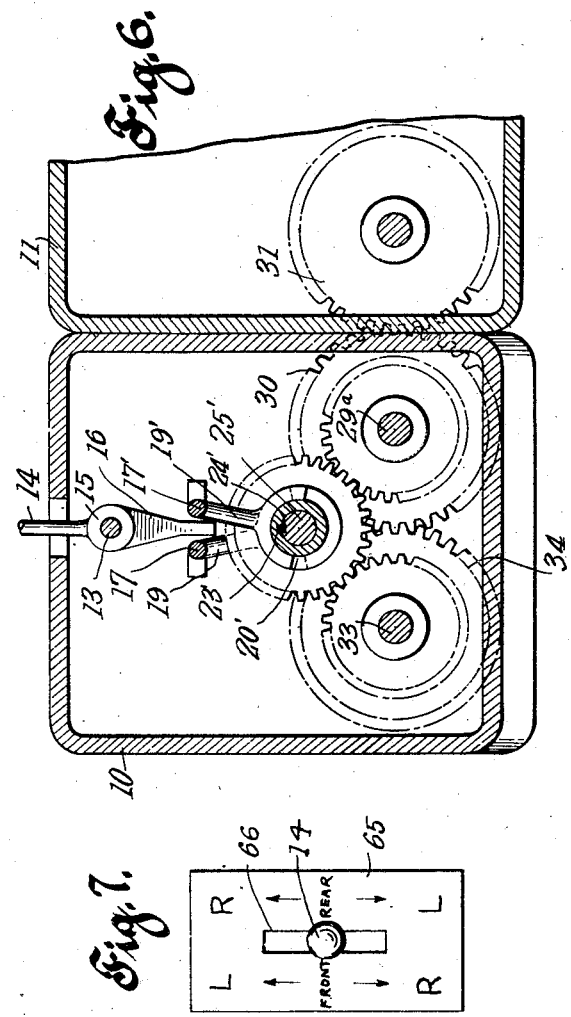
INVENTOR
John Gutmann, Jr.
BY
ATTORNEY March 22, 1932. J. GUTMANN, JR 1,850,203
JACKING APPARATUS
Filed June 27, 1929  2 Sheets-Sheet 2
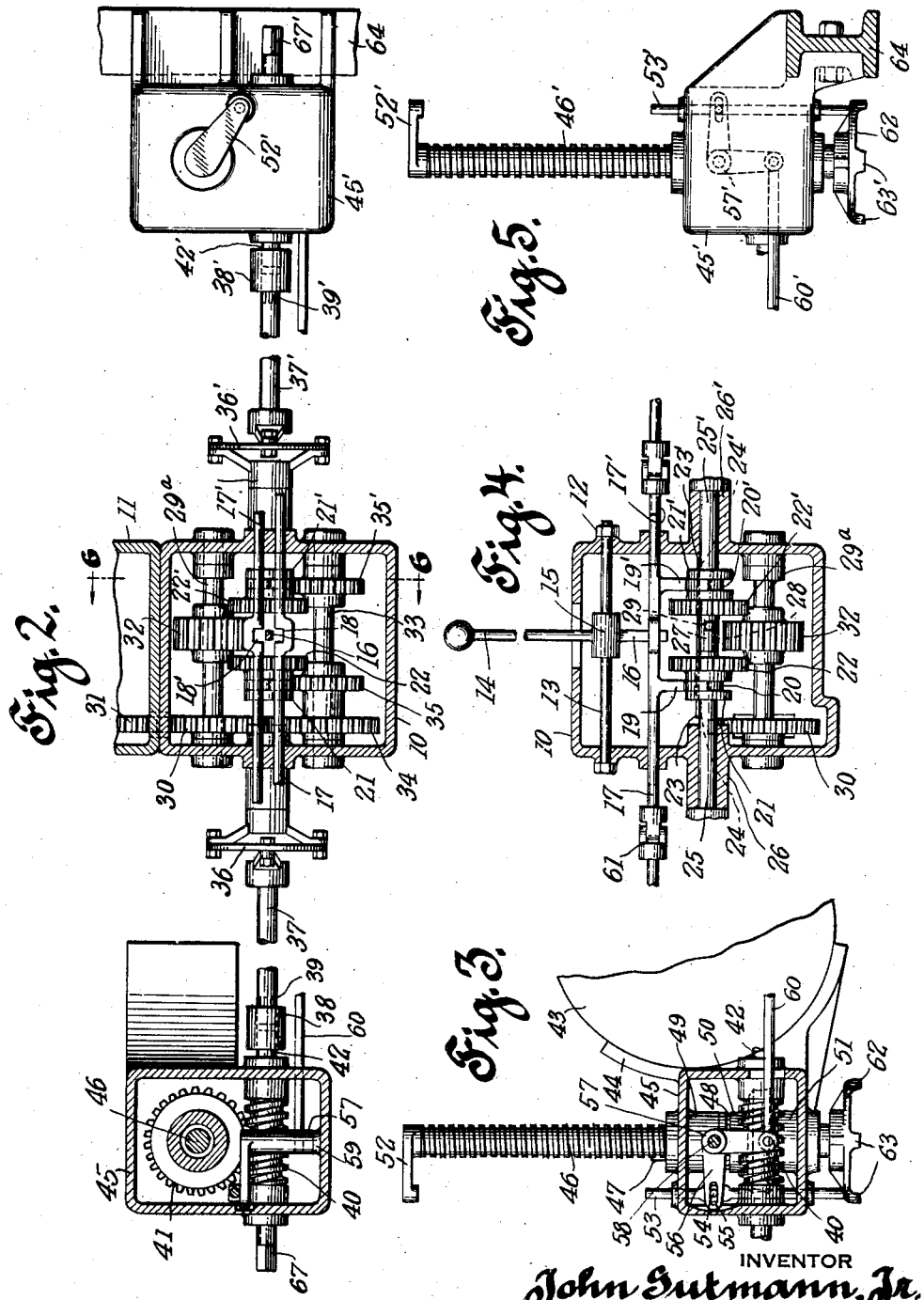
INVENTOR
John Gutmann, Jr.
BY
ATTORNEY Patented Mar. 22, 1932

1,850,203

UNITED STATES PATENT OFFICE

JOHN GUTMANN, JR., OF ST. ALBANS, NEW YORK, ASSIGNOR, BY MESNE ASSIGNMENTS, TO MOTOR JACK CORPORATION, OF NEW YORK, N. Y., A CORPORATION OF NEW YORK

JACKING APPARATUS

Application filed June 27, 1929. Serial No. 373,963.

This invention relates to jacking apparatus, particularly to power operable jacks arranged in operative positions on a motor vehicle for raising and lowering the same, and is an improvement over the kind of jacking apparatus which is disclosed in my application for Letters Patent filed in the United States Patent Office on June 7th, 1929, bearing Serial Number 369,112.

An object of the present invention is to provide a motor vehicle with improved mechanically operated jacks at its central front and rear ends, and improved means whereby the jacks may be operated selectively or simultaneously in raising or lowering a part of the vehicle or the entire vehicle, through the instrumentality of manually and automatically operable shift means controlling the selective operating mechanism.

A further feature of the invention is to equip a motor vehicle with mechanically operated jacks secured to the front and rear axles, at their centers, and means whereby the power to operate the jacks may be derived directly from an idler of the transmission apparatus of the motor vehicle.

A still further object of the invention is to equip a motor vehicle with automatic power jacks which may be raised or lowered through the clutch mechanism of the vehicle.

A still further object of the invention is in the provision of means in jacking apparatus for motor vehicles whereby the jacks may be manually operated in the event that the motor power ceases to function.

A still further object is in the provision of improved manually and automatically operable means for controlling the operation of the selective operating mechanism of said vehicle.

Further objects reside in improving the apparatus disclosed in the above mentioned application by simplifying the same in many respects and by reducing the number of parts.

These and other like objects, which will become apparent as the description progresses, are attained by the novel construction and arrangement of parts hereinafter described and shown in the accompanying drawings, and in which:—

Figure 1 is a side elevation of the jacking apparatus as applied to the chassis of a vehicle.

Figure 2 is a top view showing part in section, taken along the line 2—2 of Figure 1.

Figure 3 is a vertical sectional view of the rear jack member.

Figure 4 is a vertical sectional view of the selective operating gear box.

Figure 5 is an elevation of the front jack member.

Figure 6 is a vertical sectional view taken on line 6—6 of Figure 2.

Figure 7 is a plan view of the floor plate and hand operating lever.

The present apparatus includes two jacks mounted at the central front and rear ends of the motor vehicle, which are identical in construction and operation, being connected to a central selective operating mechanism, and identical devices for automatically controlling the selective operating mechanism.

The central operating mechanism is arranged on a side of the transmission mechanism of the vehicle and derives its power, preferably, from an idler forming part of the transmission mechanism.

Each jack is independently connected to the central selective operating mechanism and when in either extreme raised or lowered position is made inoperable through automatically actuated controlling mechanism connecting each jack with the central selective operating mechanism. The said central selective operating mechanism may thus be automatically controlled or may be manually controlled by a hand-operated lever located within convenient reach of the driver on the floor board of the vehicle.

Inasmuch as the controlling units and jacks are identical in construction and operation, only one of each will be fully described for the sake of convenience and clearness.

A casing 10 is mounted in a convenient manner adjacent the side of the transmission casing 11. Bolted to the upper portion of the ends of the casing 10 by means of bolt nuts 12, is a rod 13 upon which is loosely mounted for forward and backward sliding, and lateral swinging motion, a hand lever 14 provided with a sleeve 15 through which the rod 13 passes. The lever 14 has a lower extension 16 which, when swung laterally for the purposes hereinafter stated, is adapted to engage shifting rods 17—17' within their corresponding recesses 18—18'.

Extending from rod 17 is a forked member 19 which engages the annular grooved portion 20 of a flange 21 forming a spool on a gear 22 slidably mounted, by means of a key 23, in a key-way 24 on a shaft 25 having its end journalled at 26 in a wall of the casing 10 and protruding therefrom.

Similarly, extending from rod 17' is a forked member 19' which engages the annular grooved portion 20' of a flange 21' forming a spool on a gear 22' slidably mounted, by means of a key 23', in a key-way 24' on a shaft 25' having its end journalled at 26' in the opposite wall of the casing 10 and protruding therefrom.

The shaft 25 is provided with a male extension 27 which loosely fits into the female extension 28 of shaft 25' and bears against a ball 29 within the female extension 28. The shafts 25 and 25' are thereby made independently rotatable.

Journalled within the casing 10 is a shaft 29a having fixed on it a power gear 30 continuously in mesh, for forward motion, with the teeth of an idler 31 journalled in the transmission casing 11; and on the same shaft is fixed a wide-faced gear 32 for the purpose hereinafter stated.

Journalled within the casing 10 is another shaft 33 having fixed on it a power gear 34 so located on said shaft that it is continuously in mesh, for reverse motion, with the teeth of gear 30; and on the same shaft are fixed gears 35 and 35'. The gear 32 and the gears 35 and 35' are so located with relation to the sliding gears 22 and 22' that when the rod 17 is shifted in one direction, gear 22 will mesh with gear 32 thereby driving the shaft 25 in a certain direction, and when said rod is shifted in the opposite direction, gear 22 will mesh with gear 35 thereby driving the shaft 25 in the reverse direction; also when rod 17' is shifted in one direction, gear 22' will mesh with gear 32 thereby driving the shaft 25' in a certain direction, and when said rod is shifted in the opposite direction gear 22' will mesh with gear 35' thereby driving the shaft 25' in the reverse direction.

Power may thus be transmitted from the idler 31 to either shaft 25 or 25', on the ends of which are secured universal joint elements 36—36', respectively, front and rear, the mating elements being fixed on shafts 37—37', in turn provided with splined coupling elements 38—38' which mesh with their mating elements 39—39'. Fixed on the other ends of the splined coupling elements 38—38' are worm shafts 42—42' of the rear and front jacks respectively.

Rigidly secured to the rear axle 43 is a bracket 44 supporting a casing 45 in which is journalled the worm shaft 42 of the rear jack. The shaft 42 is provided with a worm 40 meshing with a worm wheel 41 provided with an internal screw thread to engage a threaded jack stem 46 which is prevented from turning by reason of a key 47 fixed in a part of the casing through which the stem passes. The worm wheel 41 is arranged for rotation between roller or thrust bearing 48, supported between the boss 49 of casing 45 and boss 50 of the worm wheel, and boss 51 at the opposite end of the casing 45.

Carried at the top of the jack stem 46 is a lug 52 adapted, when the jack is moved to its lowermost position, to contact with the upper end of, and actuate, a trip rod 53 having a pin 54 engaging a slot 55 provided at the free end of an arm 56 of a bell-crank lever 57 which is pivoted at 58 on a boss 59 provided within the casing 45; the free end of the other arm of the bell-crank lever 57 being connected to a rod 60 which in turn is connected by a knuckle-joint 61 to rod 17. The trip rod 63 thus actuates the bell-crank lever 57 to push the rod 60 and consequently the rod 17 whereby gear 22 is disengaged from gear 35.

At the bottom of the jack stem 46 is a bearing plate 62 provided with claws 63 to make contact with the ground when raising the vehicle. When the jack moves to its uppermost position, plate 62 contacts with the lower end of, and raises, the trip rod 53 by virtue of which the bell-crank lever 57 pulls the rod 60 and thereby rod 17, thus disengaging gear 22 from gear 32.

The casing 45' of the front jack is secured to the front axle 64 of the vehicle. The front jack and its automatic control mechanism is in all respects identical to the rear jack and its control mechanism, primed numerals representing similar parts.

The worm shafts 42—42' extend from the casing 45—45', respectively, and are provided with squared-ends 67—67', respectively, to engage a suitable handle (not shown) by which the jacks may be raised or lowered manually in the event that the motive power of the vehicle ceases to function. It is understood that instead of the squared-ends, the worm shafts may be provided with sockets (not shown) to engage the shank of a handle.

Figure 7 shows a plate 65 having a central slot 66 through which protrudes the lever 14. The slot 66 allows for forward and backward sliding motion and lateral swinging motion of the lever 14. On the plate, "R" represents "raise" and "L" represents "lower".

The manner of operation of the jacking apparatus just described is as follows:

The lever 14 is normally in neutral position as shown in Figure 7, at which time it is disengaged from the rods 17—17'.

If it is desired to, say, raise the rear end of the vehicle, the vehicle clutch pedal is first depressed and the lever 14 is laterally swung in the direction marked "Rear" on the plate 64, at which time extension 16 of lever 14 engages the rod 17 in recess 18, and lever 14 is then moved along the rod 13 in the direction of the arrow pointing to "R". This movement causes the sliding gear 22 to mesh with gear 32, and, when the vehicle clutch pedal is released, the shaft 25 and consequently shafts 37 and 42 will thereby be driven, turning the worm 43 thereby turning the worm wheel 44 and lowering the jack stem 46. As the jack stem reaches its lowermost position its lug 52 actuates the trip rod 53 and the gears 22 and 32 are automatically disengaged from each other thereby stopping operation of the jack, the lever 14 at the same time being automatically returned to its normal position.

When it is desired to lower the vehicle, the vehicle clutch pedal is again depressed, the lever 14 moved along rod 13 in the direction of the arrow pointing to "L" and the vehicle clutch pedal is released. This movement causes the sliding gear 22 to engage with reverse gear 35 which drives the shafts 25, 37 and 42 in a reverse direction whereby the jack stem 46 is raised. As the jack stem reaches its uppermost position its base plate 61 actuates the trip rod 53 and the gears 22 and 35 are automatically disengaged from each other thereby stopping the operation of the jack, the lever 14 at the same time automatically returning to its normal position.

If it is desired to raise both ends of the vehicle at the same time, the vehicle clutch pedal is depressed, the lever 14 is then made to engage one of the rods 17—17' and moved in the direction of the arrow pointing to "R" as far as it can go, then the lever 14 is disengaged from said rod, brought back to "neutral" and made to engage the other of the rods 17—17', and then moved in the opposite direction pointing towards "R". The clutch pedal is then released and both ends of the vehicle will be raised at the same time. The vehicle is lowered in a like manner.

From the foregoing it will be seen that a simple device for the purposes described has been disclosed in the preferred form of its embodiment, but it is not desired to restrict the details to the exact construction shown, it being obvious that changes, not involving the exercise of invention, may be made without conflicting with the scope of the appended claims.

Having thus described the invention, what is claimed as new and desired to secure by Letters Patent, is:—

1. The combination with a motor vehicle having a transmission case and an idler gear mounted in the case, of a gear train connecting with said idler, a gear for revolving with said gear train for transmitting forward motion, another gear for revolving with said gear train for transmitting reverse motion, a shiftable gear adapted to be engaged with either of said gears, manually operable means for engaging and disengaging said shiftable gear with and from either of said gears, a screw jack on said vehicle, means associated with said shiftable gear to actuate said jack, and automatic means for disengaging said shiftable gear from its mating gear when said jack reaches the limit of its travel in either direction.

2. The combination with the transmission of a motor vehicle, of a central operating mechanism including a gear train connecting with said transmission, a non-shiftable gear for revolving with said gear train for transmitting forward motion, a pair of non-shiftable gears for revolving with said gear train for transmitting reverse motion, a pair of independently shiftable gears adapted to be engaged selectively with said forward moving gear or one of said reverse moving gears, and associated means for engaging and disengaging each shiftable gear with and from its respective non-shiftable gear; manually operable means for actuating said latter means, a pair of screw jacks on said vehicle, means associated with each shiftable gear to actuate said jacks independently, and means actuated by each jack for automatically disengaging its respective shiftable gear from the latter's mating non-shiftable gear when the jack reaches the limit of its travel in either direction.

3. The combination with the transmission of a motor vehicle, of a central operating mechanism driven by said transmission, said central operating mechanism including non-shiftable gears for transmitting forward and reverse rotary motion, shiftable gears engageable therewith selectively, and means to selectively engage and disengage said shiftable gears with and from their respective non-shiftable gears; a pair of screw jacks respectively at the front and rear of the vehicle, connections between each jack and its respective shiftable gear, whereby said jacks are made independently operable, and means actuated by the screws of said jacks to cause disengagement of said shiftable gears from their mating non-shiftable gear when the jacks reach the limits of their travel in either direction.

4. The combination with the transmission of a motor vehicle, of a gear train connecting with said transmission, non-shiftable means associated with said gear train for transmitting forward rotary motion, non-shiftable means associated with said gear train for transmitting reverse rotary motion, shiftable means adapted to be engaged with said non-shiftable means selectively, manually operable means for selectively engaging and disengaging said shiftable means with and from its respective non-shiftable means, a screw jack on said vehicle, driving means associated with said shiftable means to actuate said jack, and means actuated by said jack to disconnect said shiftable means from said non-shiftable means when said jack reaches the limit of its travel in either direction.

5. The combination with a motor vehicle having an idler in its transmission mechanism, of a gear train connecting with said idler, gears for revolving with said gear train for transmitting forward and reverse motions, a shiftable gear engageable with either of said gears selectively, manually operable means for selectively engaging and disengaging said shiftable gear with and from either of said gears, a screw jack on said vehicle, communicating means associated with said shiftable gear to actuate said jack, and operable means actuated by said jack for automatically disengaging said shiftable gear from its mating gear when said jack reaches the limit of its travel in either direction.

6. Jacking apparatus for a motor vehicle comprising a plurality of screw jacks; a central selective operating mechanism including gears for transmitting forward and reverse motions, shiftable gears for mating with said gears selectively, and means to engage each shiftable gear with its mating gear selectively; a single manually operable means associated with said latter means, communicating means for connecting each jack with a respective shiftable gear, and operable means associated with each jack for automatically disengaging its respective shiftable gear from the latter's mating gear when the jack reaches the limit of its travel in either direction.

7. Jacking apparatus for a motor vehicle comprising a screw jack at the front and at the rear of the vehicle, a central selective operating mechanism including means driven by the vehicle transmission for transmitting forward and reverse rotary motions, and a pair of shiftable means adapted for selective engagement with said driven means; means to selectively engage said shiftable means with said driven means, and means communicating each jack with a shiftable means to raise and lower each jack selectively.

8. Jacking apparatus for a motor vehicle comprising a screw jack at the front and at the rear of the vehicle, a central selective operating mechanism connecting with each of said jacks, including means driven by the vehicle transmission for transmitting forward and reverse rotary motions and shiftable means adapted to be engaged with said driven means; a single manually operable means to engage said shiftable means with said driven means selectively, and means actuated by said jacks to automatically disengage said shiftable means at a predetermined point.

9. Jacking apparatus for a motor vehicle comprising a screw jack at the front and at the rear of the vehicle, a central selective operating mechanism connecting with each of said jacks, including means driven by the vehicle transmission for transmitting forward and reverse rotary motions, and shiftable means adapted to be engaged with said driven means; means to engage said shiftable means with said driven means to operate said jacks selectively, and means actuated by said jacks to automatically disengage said shiftable means from said driven means at a predetermined point.

10. Jacking apparatus for a motor vehicle comprising a screw jack at the front and at the rear of the vehicle, a central selective operating mechanism connecting with each of said jacks, including means driven by an idler of the vehicle transmission mechanism for transmitting forward and reverse rotary motions, and shiftable means adapted to be engaged with said driven means; means to engage said shiftable means with said driven means to raise and lower each jack selectively.

11. Jacking apparatus for a motor vehicle comprising a screw jack at the front and at the rear of the vehicle, a central selective operating mechanism, including means driven by an idler of the vehicle transmission mechanism and shiftable means adapted to engage said driven means; means to engage said shiftable means with said driven means to operate said jacks selectively, means actuated by said jacks to automatically disengage said shiftable means from said driven means when the jacks have reached the limits of their movements in either direction.

12. The combination with the transmission of a motor vehicle, of a gear train connecting with said transmission mechanism, a gear revolving with said gear train for transmitting forward motion, another gear revolving with said gear train for transmitting reverse motion, a shiftable gear adapted to be engaged with either of said gears, manually operable means for engaging and disengaging said shiftable gear with and from either of said gears selectively, a screw jack on said vehicle, means associated with said shiftable gear to actuate said jack, and automatic means associated with said manually operable means for disengaging said shiftable gear from its mating gear when said jack reaches a predetermined point in either direction.

13. The combination with the transmission of a motor vehicle, of a central operating mechanism driven by said transmission, said central operating mechanism including non-shiftable gears for transmitting forward and reverse rotary motions, shiftable gears adapted to be engaged with said non-shiftable gears selectively, shifting means associated with said shiftable gears, and means adapted for slidable and swinging motion for engagement with either of said shifting means to selectively engage and disengage each shiftable gear with and from its respective non-shiftable gear; a pair of screw jacks respectively at the front and rear of the vehicle, connections between each jack and its respective shiftable gear, whereby said jacks are made independently operable, and means actuated by the screws of said jacks to cause disengagement of said shiftable gears from their mating non-shiftable gears when the jacks reach the limits of their travel in either direction.

14. Jacking apparatus for a motor vehicle having a transmission comprising a screw jack at the front and at the rear of the vehicle, a central selective operating mechanism including means driven by the vehicle transmission for transmitting forward and reverse rotary motions, a pair of shiftable means adapted for selective engagement with said driven means, shifting means associated with each shiftable means, and means adapted for slidable and swinging motion for engagement with either of said shifting means to selectively engage and disengage said shiftable means with and from their mating driven means; and means communicating each jack with a shiftable means to raise and lower each jack selectively.

15. Jacking apparatus for a motor vehicle having a transmission including a plurality of mechanically operable jacks, each of said jacks having a movable lifting screw; a central selective operating mechanism associated with the transmission for effecting the movement of each screw in opposite directions, means independently connecting each of said jacks with said mechanism, said mechanism including power transmission means including gears certain of which are shiftable; and mechanism actuated by each jack for automatically shifting the said shiftable gears.

In testimony whereof I have affixed my signature.

JOHN GUTMANN, Jr.